United States Patent
Cheng et al.

(10) Patent No.: US 9,444,898 B1
(45) Date of Patent: Sep. 13, 2016

(54) ANNOTATED COMMUNICATION

(75) Inventors: Yan Cheng, Great Falls, VA (US); Larry L. Lu, Great Falls, VA (US)

(73) Assignee: AOL INC., Dulles, VA (US)

(*) Notice: Subject to any disclaimer, the term of this patent is extended or adjusted under 35 U.S.C. 154(b) by 95 days.

(21) Appl. No.: 11/936,373

(22) Filed: Nov. 7, 2007

Related U.S. Application Data (60) Provisional application No. 60/895,600, filed on Mar. 19, 2007, provisional application No. 60/948,775, filed on Jul. 10, 2007.

(51) Int. Cl.
*H04L 29/08* (2006.01)
*G06Q 30/02* (2012.01)

(52) U.S. Cl.
CPC ........... *H04L 67/20* (2013.01); *G06Q 30/0277* (2013.01)

(58) Field of Classification Search
USPC ................................................. 709/206, 207
See application file for complete search history.

(56) References Cited

U.S. PATENT DOCUMENTS

| | | | |
|---|---|---|---|
| 6,845,370 B2* | 1/2005 | Burkey et al. ................. 707/749 |
| 7,007,074 B2* | 2/2006 | Radwin .......................... 709/217 |
| 7,617,121 B1 | 11/2009 | DeMayo et al. |
| 2003/0221009 A1* | 11/2003 | Standridge et al. .......... 709/227 |
| 2004/0117451 A1* | 6/2004 | Chung ................ H04L 12/5855 709/207 |
| 2005/0021744 A1* | 1/2005 | Haitsuka ............. H04L 12/2856 709/224 |
| 2005/0021863 A1* | 1/2005 | Jungck .................... H04L 47/10 709/246 |
| 2005/0044232 A1* | 2/2005 | Keane .................... G06Q 30/06 709/227 |
| 2005/0060365 A1* | 3/2005 | Robinson .............. H04L 69/329 709/203 |
| 2005/0060377 A1* | 3/2005 | Lo et al. ........................ 709/206 |
| 2005/0060417 A1* | 3/2005 | Rose ...................... G06Q 10/00 709/228 |
| 2005/0086316 A1* | 4/2005 | Chen .................... G06Q 10/107 709/207 |
| 2005/0102389 A1* | 5/2005 | Liscano ............ H04M 3/42229 709/224 |
| 2005/0193129 A1* | 9/2005 | Barlow ............... H04L 12/1818 709/229 |
| 2005/0198177 A1* | 9/2005 | Black .................... G06Q 10/107 709/206 |
| 2005/0210126 A1* | 9/2005 | Friedman ................ H04L 63/02 709/220 |
| 2005/0235031 A1* | 10/2005 | Schneider ........... G06F 17/2229 709/203 |
| 2006/0085515 A1* | 4/2006 | Kurtz et al. .................. 709/207 |
| 2006/0179453 A1* | 8/2006 | Kadie et al. ..................... 725/34 |
| 2006/0190576 A1* | 8/2006 | Lee ........................ G06Q 30/02 709/223 |
| 2006/0200525 A1* | 9/2006 | Li et al. ......................... 709/206 |
| 2006/0253582 A1* | 11/2006 | Dixon ............... G06F 17/30864 709/225 |
| 2006/0253583 A1* | 11/2006 | Dixon ................. H04L 63/1441 709/225 |
| 2006/0282533 A1* | 12/2006 | Steelberg et al. ............. 709/224 |
| 2007/0088852 A1* | 4/2007 | Levkovitz ........... H04L 12/1859 709/246 |
| 2007/0118638 A1* | 5/2007 | Ban ..................... G05B 23/0272 709/224 |
| 2007/0233814 A1* | 10/2007 | Kapur ............... G06F 17/30899 709/219 |
| 2008/0040433 A1* | 2/2008 | Glasgow .............. G06Q 10/107 709/206 |
| 2008/0040485 A1* | 2/2008 | Glasgow ................ G06Q 10/10 709/227 |
| 2008/0071929 A1* | 3/2008 | Motte .................. G06F 17/3089 709/246 |
| 2008/0086368 A1* | 4/2008 | Bauman et al. ................. 705/14 |
| 2008/0134235 A1* | 6/2008 | Kalaboukis ..................... 725/32 |
| 2008/0155018 A1* | 6/2008 | Fortier ................... G06Q 10/10 709/204 |
| 2008/0201434 A1* | 8/2008 | Holmes et al. ............... 709/206 |
| 2008/0235083 A2* | 9/2008 | Bosarge et al. ................. 705/14 |

* cited by examiner

*Primary Examiner* — Ninos Donabed
(74) *Attorney, Agent, or Firm* — Finnegan, Henderson, Farabow, Garrett & Dunner, LLP (57) ABSTRACT

Techniques for annotating communications are described. An electronic message sent from a sender messaging identity to a recipient messaging identity is received. The message is analyzed to identify third-party information related to a portion of the message. The portion of the message is annotated to enable presentation of the third-party information by the recipient messaging identity. The message including the annotated portion of the message is presented on a display device for viewing by the recipient messaging identity.

27 Claims, 7 Drawing Sheets

ANNOTATED COMMUNICATION

CROSS REFERENCE TO RELATED APPLICATIONS

This application claims the benefit of U.S. Provisional Application No. 60/895,600, filed Mar. 19, 2007, and titled ANNOTATED COMMUNICATION and U.S. Provisional Application No. 60/948,775 filed Jul. 10, 2007, and titled ANNOTATED COMMUNICATION, both of which are incorporated by reference in their entirely.

TECHNICAL FIELD

This description relates to computer-based communications accessible through a network of computers.

BACKGROUND

On-line services may provide users with the ability to send and receive instant messages. Instant messages may be exchanged in a private or public on-line conversation between two or more people who have access to an instant messaging service and who have installed communications software necessary to access and use the instant messaging service. A participant list that includes the communications identities with which a user exchanges instant messages may be displayed for a user and may be used to establish instant messaging sessions with those other identities. The participant list may indicate whether each identity associated with the participant list is on-line.

On-line services also may provide users with the ability to participate in a chat session with other users. A chat session also may be referred to as a chat room or a channel. In one example of a chat session, instant messages may be exchanged in an on-line conversation between two or more people who have access to an instant messaging service and who have installed communications software necessary to access and use the instant messaging service.

SUMMARY

In one general aspect, communications are annotated. An electronic message sent from a sender messaging identity to a recipient messaging identity is received. The message is analyzed to identify third-party information related to a portion of the message. The portion of the message is annotated to enable presentation of the third-party information by the recipient messaging identity. The message including the annotated portion of the message is presented on a display device for viewing by the recipient messaging identity.

Implementations may include one or more of the following features. For example, the message may include a blog, an instant message, an electronic message, a chat message, and a short message service message. The annotated portion of the message may be a hyperlink, an animated icon, a computer-generated sound, an audio segment and a video clip. The third-party information may relate to one or more of food, restaurants, vehicles, movies, clothing, shopping and travel.

The portion of the message may be annotated based on information associated with the sender messaging identity. The information associated with the sender messaging identity may include a predefined association between message content and third-party information. The message content may include text. The portion of the message may include the entire message or may be a word in the message.

The message may include a first instant message, the recipient messaging identity may include a recipient instant messaging identity, and the sender messaging identity may include a sender instant messaging identity. A second instant message may be analyzed to identify third-party information related to a portion of the second message. The portion of the second instant message may be annotated to enable presentation of the third-party information by the recipient instant messaging identity. The second instant message including the annotated portion of the message may be presented on a display device for viewing by the recipient instant messaging identity.

Both of the first message and the second message may be included in a single communication stream or session between the sender instant messaging identity and the recipient instant messaging identity. The first message may be included in a first communication stream or session between the sender instant messaging identity and the recipient instant messaging identity, and the second message may be included in a second communication stream or session between the sender instant messaging identity and the recipient instant messaging identity. The first message may be included in a first communication stream or session between the sender instant messaging identity and the recipient instant messaging identity, and the second message may be included in a second communication stream or session involving only one of the sender instant messaging identity and the recipient instant messaging identity.

The message may be analyzed based on a time of exchange of the message between the sender instant messaging identity and the recipient instant messaging identity. The analyzing may include using profile information related to at least one of the sender instant messaging identity and the recipient instant messaging identity. The analyzing may include using geographic location information for at least one of the sender instant messaging identity and the recipient instant messaging identity.

In another general aspect, a graphical user interface is generated on a display device for displaying annotated communications. The graphical user interface includes an instant message display having a message compose area capable of displaying text included in a message sent from a sender to a recipient, a message history area capable of displaying instant messages communicated between the sender and the recipient in a communications session, and communication controls. At least one communication control is configured to receive an indication that the message displayed in the message compose area is to be sent from the sender to the recipient. A portion of the message in the message is annotated in response to identification of third-party information related to the portion of the message that is annotated. The message including the annotated portion is displayed in the message history area. Implementations may include one or more of the features noted above.

Implementations of the techniques discussed above may include a method or process, a system or apparatus, or computer software on a computer-accessible medium. The details of one or more of the implementations are set forth in the accompanying drawings and description below. Other features will be apparent from the description and drawings, and from the claims.

DESCRIPTION OF DRAWINGS

Like reference symbols in the various drawings indicate like elements.

DETAILED DESCRIPTION

Techniques are described to annotate communication between two parties to provide a third-party content based on related words and understanding of conversation topics of the communication between the two parties. Such annotated communication may help focus a viewer's attention on the third-party content. More particularly, a portion of the communication sent between the communicating parties is annotated with third-party content. The annotation may be, for example, a hyperlink such that an annotated term within the communication is a hyperlink, an animated icon, a played sound, an audio segment or a video clip. As illustrated by a hyperlink implementation of an annotation, the annotation may be actionable such that third-party content related to the communication is presented when the annotation (in this example, the hyperlink) is activated.

Third-party content may be related to, for example, types of food, restaurants, vehicles, movies, clothing, shopping and travel. The third-party content may be presented in the form of a recommendation or an advertisement related to the content of the communication between the two parties.

The techniques of annotating communications may help to address the problem that some identities do not recognize, ignore or otherwise are not responsive to third-party information that is displayed outside of the message content.

In one example illustration, an instant message may be exchanged between two parties in which a portion of an instant message is annotated. As illustrated, a sender sends an instant message to a recipient asking whether the recipient is interested in going to lunch together.

Sender: Want to grab a bite of lunch?

The sender's message is annotated such that the term "lunch" is a hyperlink that, when activated, displays a list of restaurants that are near the geographic location of the sender and the recipient of the instant message. Either or both of the sender or recipient may activate the "lunch" hyperlink to display a list of restaurants. This example illustration is described more fully with respect to FIGS. 1-3.

Figure 1:
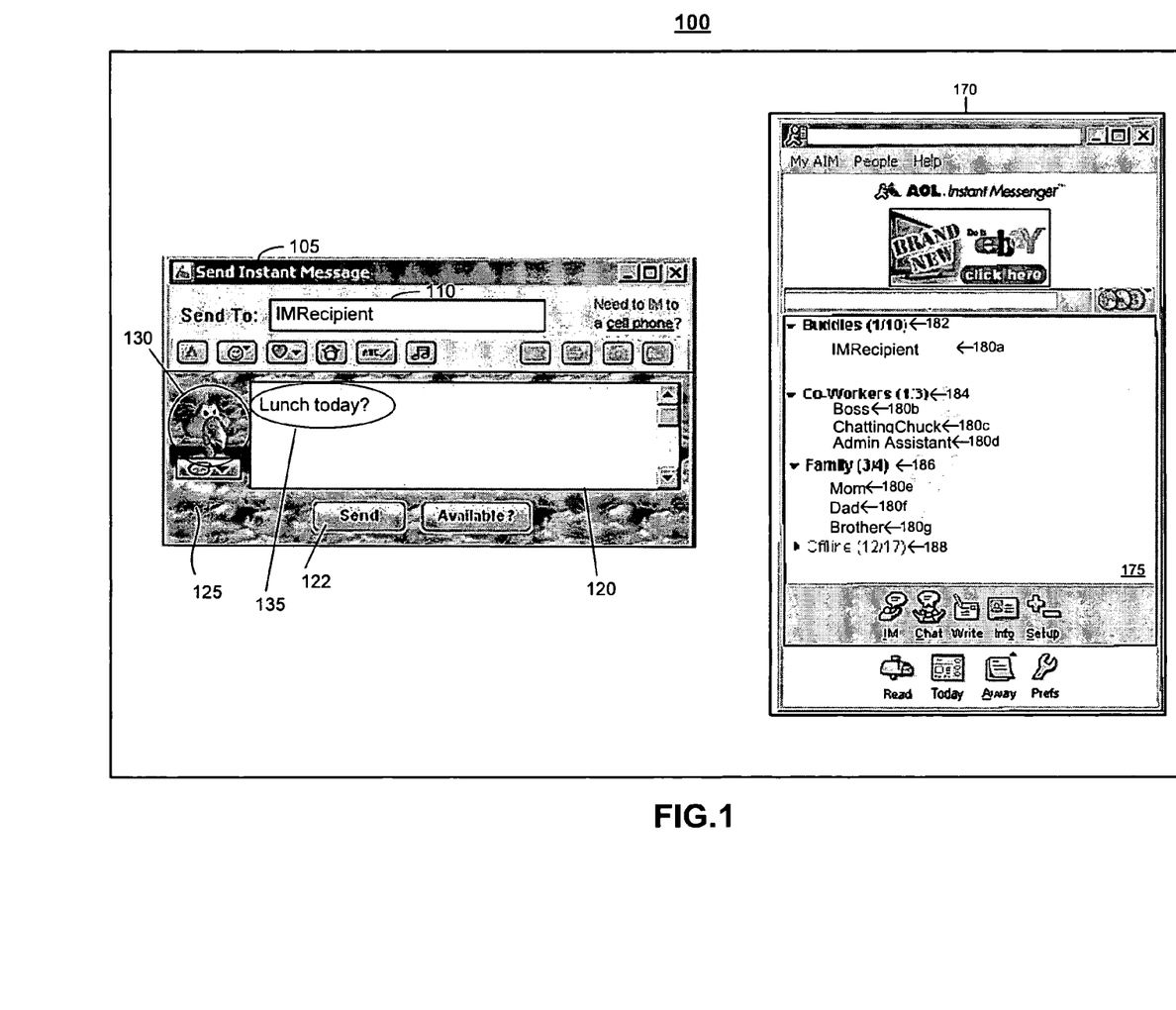
FIGS. 1-3 are illustrations of example user interfaces presented to an instant messaging identity during an instant messaging session and including annotated communications.
Figure 2:
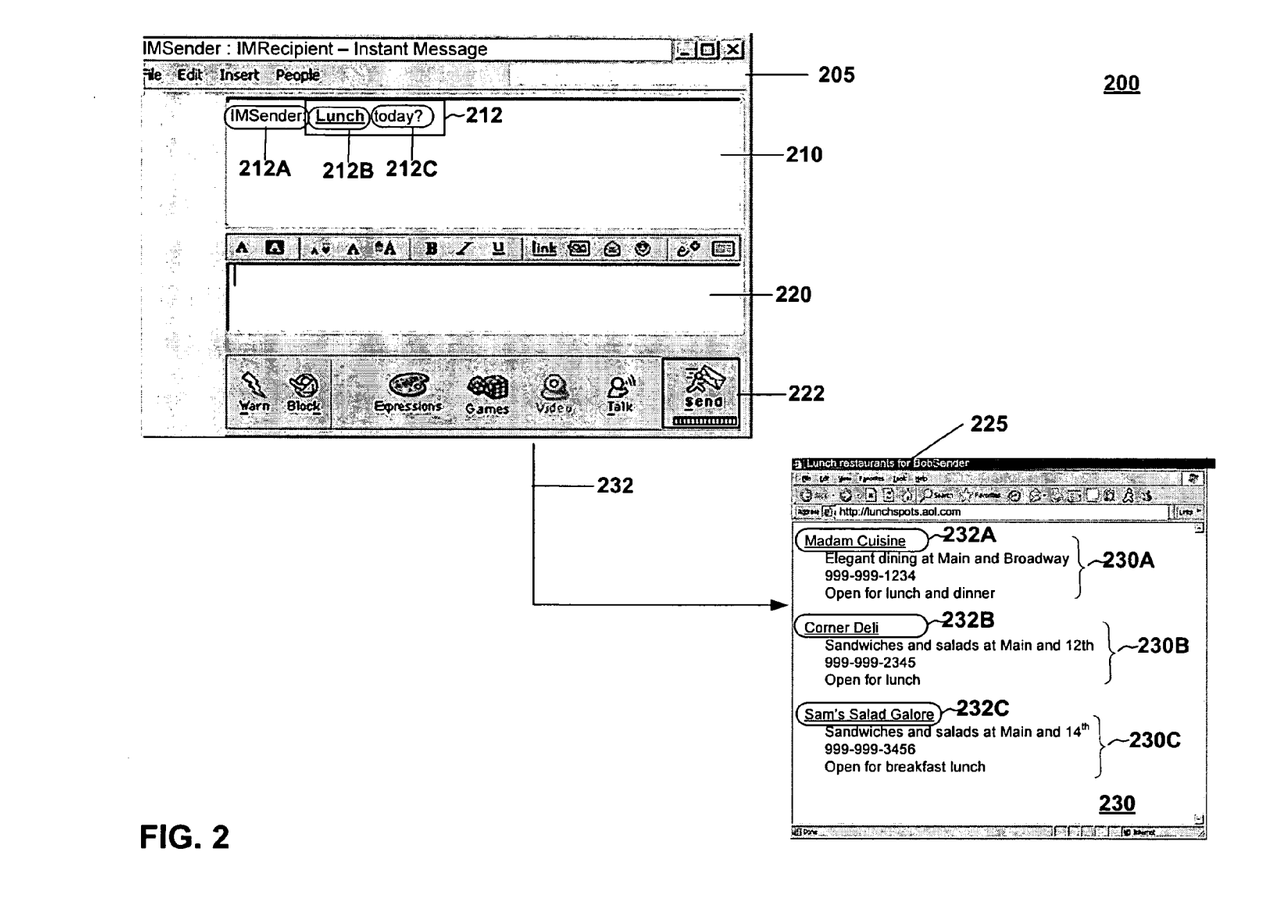
Figure 3:
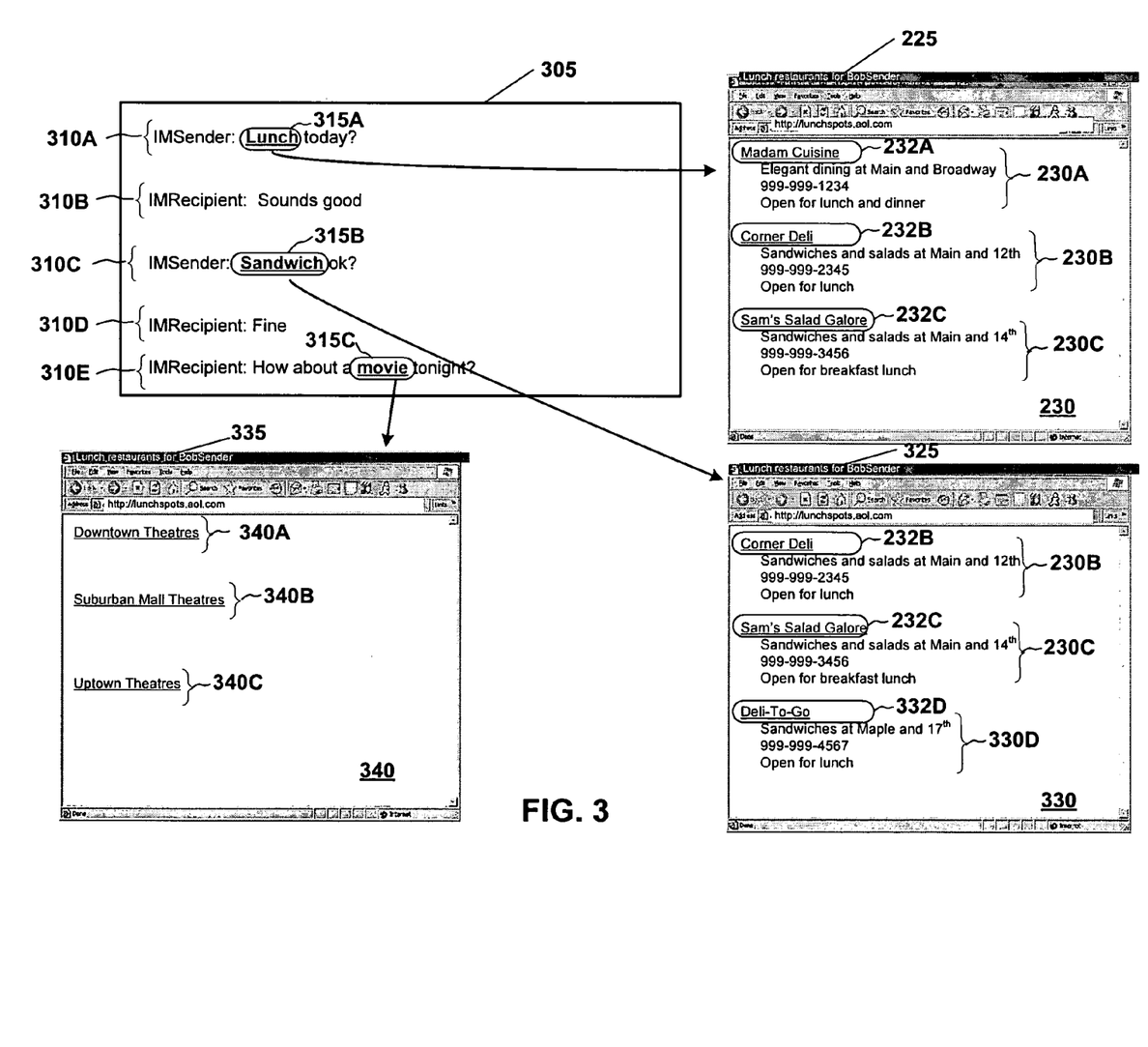

FIGS. 1-3 illustrate a series of example graphical user interfaces for an instant messaging service capable of annotating instant messages. Referring to FIG. 1, an example graphical user interface 100 for an instant messaging service capable of annotating, with third-party content, instant messages exchanged between instant message users. The instant message user interface 100 may be viewed by a user who is an instant message sender and whose instant messaging service is configured to annotate, with third-party content, instant messages exchanged between instant message users.

As illustrated, the user IMSender is an instant message sender using the user interface 100. The instant message sender sends an instant message that is annotated with third-party content related to the subject matter of the instant message. The instant messaging communications session may be conducted simultaneously, near-simultaneously, or serially.

More particularly, the instant message user interface 100 includes an instant message user interface 105 and an instant messaging contact list window 170.

The instant message user interface 105 includes a recipient indicator 110 that indicates a screen name of a recipient of the instant messages sent with the interface 105. The screen name (or other type of identity identifier or user identifier) of the potential recipient may be identified by selecting a screen name from a contact list, such as contact list 175 shown in the contact list window 170, or may be entered by the user directly in the recipient indicator 110. As illustrated, an instant message recipient screen name IMRecipient has been identified in the recipient indicator 110.

A message compose text box 120 enables text to be entered for a message and displays the text of a message to be sent from the sender to a recipient identified in the recipient indicator 110. Once specified in the message compose text box 120, the message may be sent by activating a send button 122. In some implementations, the instant message user interface 105 may include a message transcript text box (not shown) that displays the text of messages sent between the sender and/or a recipient portion (also not shown) that identifies the recipient, such as, for example, the recipient indicator 110 of the instant message interface 105 of FIG. 1. An example of such an interface is shown in FIG. 2.

The message compose text box 120 includes text 135 (i.e., "Lunch today?") entered for a message to be sent to the recipient identified in the recipient indicator 110 when the send button 122 is activated. More particularly, after the send button 122 is activated to send the text 135 in an instant message to the user identified by the screen name in the recipient indicator 110, a portion of the text 135 is annotated with third-party content based on the subject matter of the portion of the text 135, as described more fully later.

Wallpaper is applied to some or all of the window portion 125 that is outside of the message compose text box 120. A sender avatar 130 is displayed over, or in place of, wallpaper applied to some or all of the window portion 125. In this example, the wallpaper appears to cover the window portion 125 that is outside of the message compose text box 130 and appears as a background relative to the sender avatar 130. As shown, the wallpaper 130 displays a non-uniform pattern (i.e., clouds and sky), though this need not be the case.

The instant messaging contact list window 170 includes an instant message sender-selected contact list 175 of representations 180a-180g for potential instant messaging recipients ("buddies"). Buddies typically are contacts who are known to the potential instant message sender (here, IMSender). In the contact list 175, the representations 180a-180g include text identifying the screen names of the buddies included in contact list 175. The representations 180a-180g may provide connectivity information to the instant message sender about the buddy, such as whether the buddy is online, how long the buddy has been online, whether the buddy is away, or whether the buddy is using a mobile device.

Buddies may be grouped by an instant message sender into one or more user-defined or pre-selected groupings ("groups"). As shown, the instant message contact list 175 has three groups, Buddies 182, Co-Workers 184, and Family 186. IMRecipient 180a belongs to the Buddies group 182; Boss 180b, ChattingChuck 180c and Admin Assistant 180d belong to the Co-Workers group 184; and Mom 180e, Dad 180*f* and Brother 180*g* belong to the Family group 186. When a buddy's instant message client program is able to receive communications, the representation of the buddy in the buddy list is displayed under the name or representation of the buddy group to which the buddy belongs. As shown, at least buddies 180*a*-180*g* are online. In contrast, when a buddy's instant message client program is not able to receive communications, the representation of the buddy in the buddy list may not be displayed under the group with which it is associated, but it may instead be displayed with representations of buddies from other groups under the heading Offline 188. All buddies included in the contact list 175 are displayed either under one of the groups 182, 184, or 186, or under the heading Offline 188.

Continuing the example instant messaging session of described with respect to FIG. 1, FIG. 2 illustrates an instant message user interface 205 with which instant messages may be sent and received. As shown, the instant message user interface 205 is used to exchange communications with a two instant messaging users where a portion of a message is annotated such that third-party content related to the message is presented when the annotation is activated. More particularly, the series 200 depicts communications exchanged between two communications identities (i.e., IMSender and IMRecipient). The instant message user interface 205 is displayed on an instant messaging system used by IMRecipient to access the instant messaging service and receive the instant message sent by IMSender, as described with respect to FIG. 1.

The instant message user interface 205 includes a message history box 210 that lists the instant messages sent between the IMSender and IMRecipient during the instant messaging communication session. The message history box 210 also may be referred to as a message transcript box 210. Each message is presented with an indication of a communications identity identifier (e.g., a screen name) by which the sender of the message is identified. Each message listed in the message history box also includes the text of the instant message sent by the sender. For example, the message history box 210 includes a message 212 sent by a instant messaging user with a screen name "IMSender" 212A to a instant messaging user with a screen name of "IMRecipient," as described previously with respect to FIG. 1. In the example of instant message user interface 205, the IMSender communications identity has sent the message 212 to IMRecipient. The instant message user interface 205 represents the interface presented to the IMRecipient when the message 212 sent by the IMSender is received by IMRecipient instant messaging system.

As illustrated, a portion 212B of the message text 212 sent by the IMSender has been annotated to indicate third-party information related to the subject matter represented by the portion 212B is available for presentation. More particularly, the portion 212B of the message text 212 (collectively represented by annotated text 212B and text 212C) is a hyperlink that, when activated, displays browser interface 225, as indicated by arrow 232.

The browser interface 225 includes third-party information 230—that is, content that is provided by one other than the parties exchanging instant messages (i.e., IMSender and IMRecipient). The third-party content identifies three restaurants 230A-230C that are located nearby IMSender and IMRecipient as possible lunch venues. The information presented about each of the three restaurants 230A-230C includes the restaurant name 232A-232C, respectively. In this example, each of the restaurant names 232A-232C are able to be activated to display additional information about the restaurant. For example, the restaurant names 230A-230C each may be a hyperlink to the restaurant's home web page or a link to a restaurant guide review of the restaurant.

Referring again to the instant message user interface 205, the user interface 205 includes a message compose text box 220 in which IMRecipient may specify a message to be sent to the IMSender. After a message has been specified in the message compose text box 220, the message may be sent by selecting a send button 222. After the send button 222 has been selected, the text that has been entered in the message compose text box 220 is sent to the recipient, the message compose text box 220 is cleared, the message is annotated (if applicable to the subject matter of the message or a portion thereof), and the message (or the annotated message) is added to the message history box 210.

Referring to FIG. 3 and continuing the example instant messaging communication session described with respect to FIGS. 1 and 2, an instant message user interface 305 represents a message history box showing the messages 310A-310E exchanged between IMSender and IMRecipient. As illustrated, the messages 310A, 310C and 310E include annotations 315A, 315B and 315C of third-party information related to the subject matter of the message 310A, 310C or 310E.

More particularly, the "Lunch" portion of message 310A is annotated 315A (as illustrated by the underlined text) and, when the annotation 315A is activated (such as by a user clicking on, or mousing over, the annotation), the browser interface 225 is presented, as described previously with respect to FIG. 2.

When the annotation 315B "Sandwich" of message 310C is activated by a user, the browser interface 325 is presented. The browser interface 325 includes third-party information 330, which, in turn, identifies three restaurants 230B, 230C and 330D, which are possible lunch venues that serve sandwich-type meals. In contrast to third-party information 230 presented in browser interface 225 based on the message subject matter "lunch," the third-party information 330 presented in browser interface 225 is based on the subject matter "Lunch" of message 310A and the subject matter "Sandwich" of message 310C in the communication session. The third-party information 330 includes only lunch venues that serve sandwich-type meals and does not include the Madam Cuisine 232A restaurant that is presented in third-party information 230. The information presented about each of the three restaurants 230B, 230C and 330D includes the restaurant name 232B, 232C and 332D, each of which are configured to present additional information when activated by a user.

When the annotation 315C "movie" of message 310E is activated by a user, the browser interface 335 is presented. The browser interface 335 includes third-party information 340, which, in turn, identifies two collections 340A and 340B of movie theaters. The third-party information 340 presented in browser interface 335 is based on the subject matter "movie" of message 310E. The third-party information 340 includes a movie theater venue 340A that is proximate to the work location of IMSender and IMRecipient as well as a movie theater venue 340B that is proximate to the home of IMRecipient. The information presented about each of the movie theater venues 340A and 340B is configured to present additional information when activated by a user.

Figure 4:
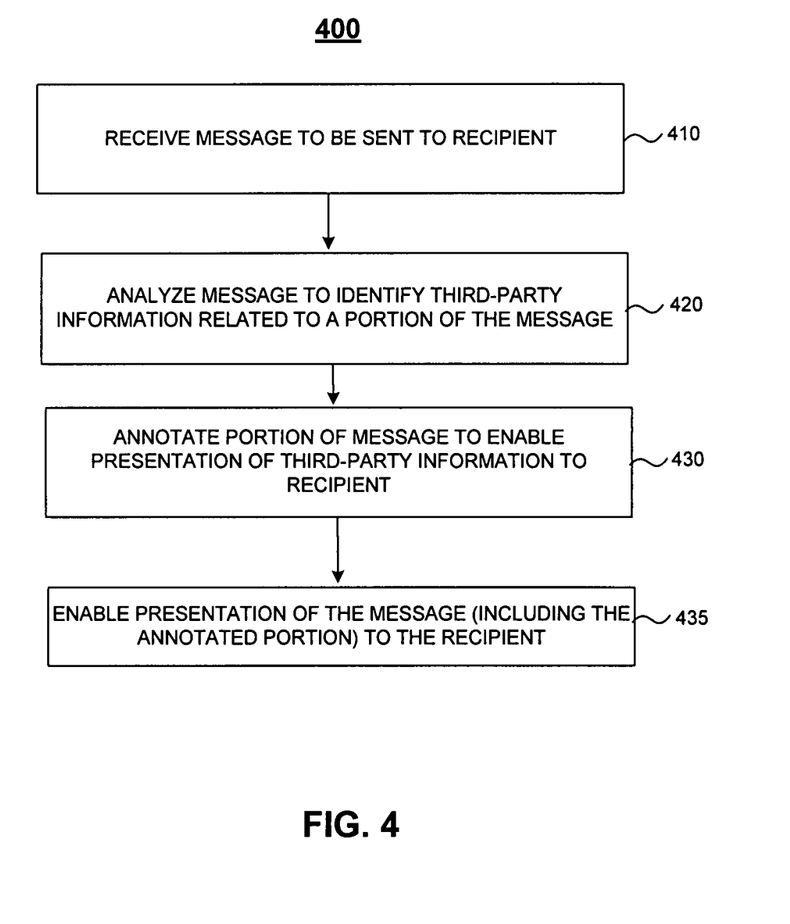
FIGS. 4 and 6 are diagrams of example processes for annotating communications between communication identities such that third-party content related to the communication is presented when the annotation is activated.

FIG. 4 illustrates an example process 400 for annotating instant messages exchanged between users of a communication system. The communication system performing the process 400, for example, may be an instant messaging system, a chat system, an electronic messaging (e-mail) system or a short message service (SMS) messaging system.

The process 400 begins with the communication system receiving a message to be sent to a recipient (step 410). This may be accomplished, for example, by the communication system monitoring and intercepting communications sent using the communication system.

The communication system analyzes the message to identify third-party information related to the message or a portion of the message (step 420). For example, the communication system may search for predefined keywords or phrases that are associated with third-party information. This may be accomplished techniques for categorizing, classifying and clustering natural language statements. The analyzing process, for example, may include techniques similar to those used to identify and filter spam messages, as well as techniques used to identify and categorize content for application of parental controls.

The communication system annotates a portion of the message to enable presentation of third-party information to the message recipient (step 430). For example, the portion of the message may be annotated by transforming the message portion into a hyperlink or by inserting clickable icons into the message. Alternatively or additionally, the message in its entirety may be annotated.

The communication system enables presentation of the message (including the annotated portion) to the recipient (step 435). This may be accomplished, for example, by transmitting the message (including the annotated portion) to the recipient for presentation. Additionally or alternatively, the message (including the annotated portion) may be stored for later transmission to the recipient.

Figure 5:
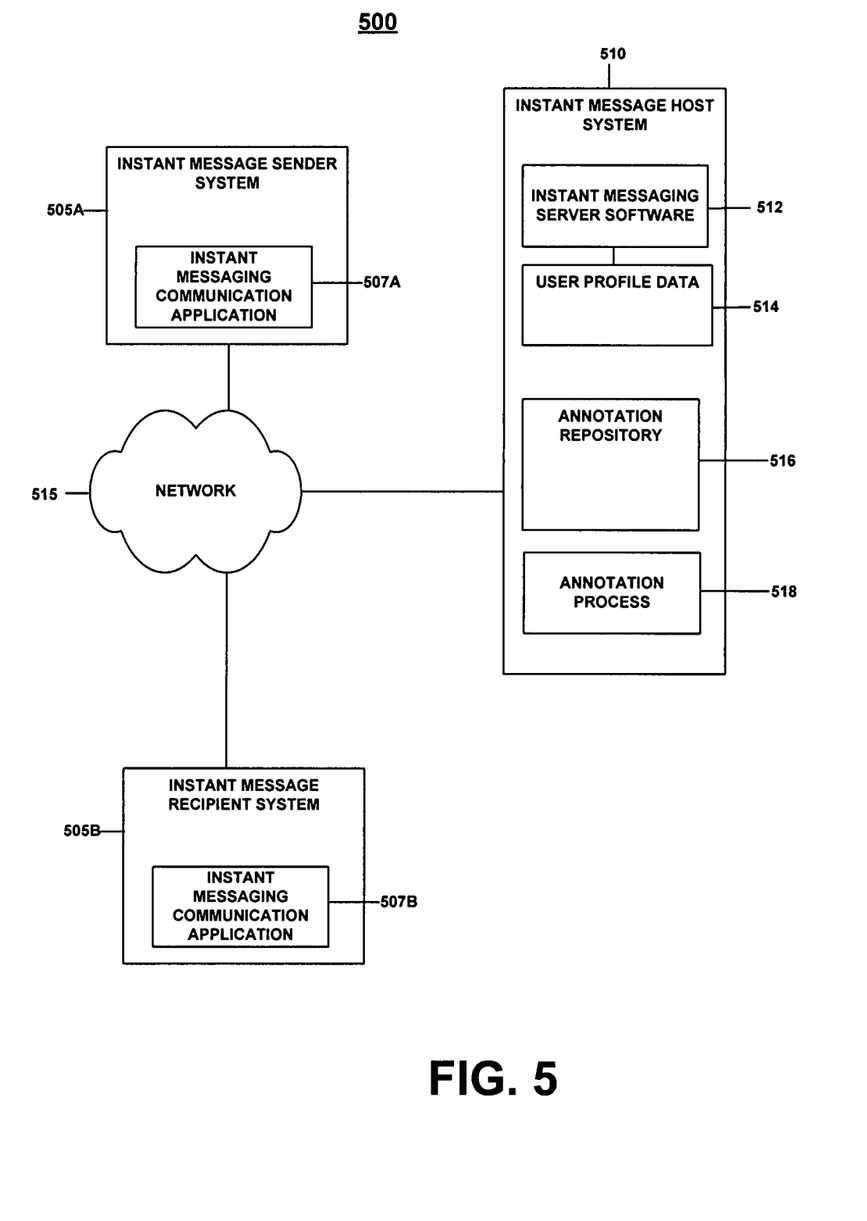
FIGS. 5 and 7 are block diagrams of example communications systems capable of annotating communications between communication identities such that third-party content related to the communication is presented when the annotation is activated.

FIG. 5 illustrates an example communications system 500 capable of annotating, with third-party content, instant messages exchanged between instant message users. The communications system 500 includes an instant message sender system 505A, an instant message recipient system 505B, an instant message host system 510 and a network 515.

The host system 510 includes instant messaging server software 512 configured to route communications, over the network 515, between the instant message sender system 505A and the instant message recipient system 505B. The instant messaging server software 512 may make use of user profile data 514. The user profile data 514 includes indications of an avatar, wallpaper, and one or more self-expression items selected by an instant message sender. The user profile data 514 also may include geographic location information associated with the user or representing the user's geographic location.

The host system 510 also includes an annotation repository 516, which stores third-party information on which annotations of instant messages may be based. The annotation repository 516 also includes triggers, where a trigger identifies text or other type of data included in the instant message that is to be annotated with third-party content. The annotation repository 516 also includes associations between triggers and third-party content with which to annotate an instant message that includes the trigger.

The host system 510 also includes annotation process software 518 that, when executed, annotates, with third-party content, an instant message sent between the instant message sender system 505A and the instant message recipient system 505B. More particularly, the processor, when executing the annotation process software 518, accesses information from the annotation repository 516 and uses the information to identify third-party content that corresponds to the message or a portion thereof. This may be accomplished, for example, using the example annotation process 400 described previously with respect to FIG. 4 or the example annotation process 600 described with respect to FIG. 6.

The network 515 typically includes a series of portals interconnected through a coherent system. Examples of the network 515 include the Internet, Wide Area Networks (WANs), Local Area Networks (LANs), analog or digital wired and wireless telephone networks (e.g., a Public Switched Telephone Network (PSTN), an Integrated Services Digital Network (ISDN), or a Digital Subscriber Line of various types (DSL)), or any other wired or wireless network. The network 515 may include multiple networks or subnetworks, each of which may include, for example, a wired or wireless data pathway.

Figure 6:
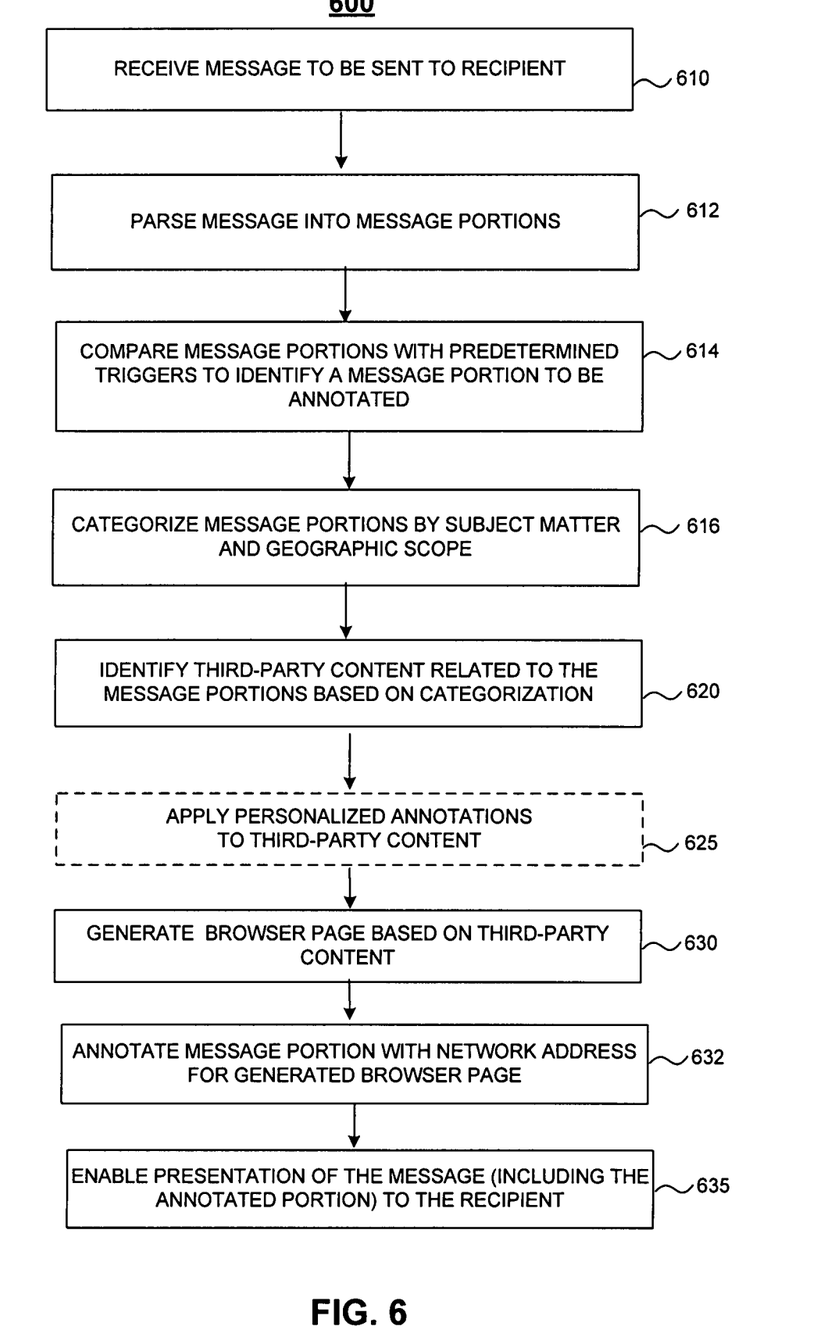

FIG. 6 illustrates another example process 600 for annotating instant messages exchanged between users of a communication system. The communication system performing the process 600, for example, may be an instant messaging system, a chat system, an electronic messaging (e-mail) system or a short message service (SMS) messaging system.

The process 600 begins with the communication system receiving a message to be sent to a recipient (step 610). This may be accomplished, for example, as described previously with respect to step 410 of FIG. 4.

The communication system parses the message into message portions (step 612) and compares the message portions with predetermined triggers to identify a message portion or portions to be annotated (step 614). This may be accomplished, for example, by comparing a message portion with each of the predetermined triggers to identify one or more matches. In some cases, perhaps even many cases, a predetermined trigger is not identified for a message portion. In some implementations, the process of comparing message portions with predetermined triggers may be executed in parallel. The predetermined triggers may be stored, for example, in an annotation data store, such as an implementation of the annotation repository 516 described previously with respect to FIG. 5.

In some implementations, a maximum number of message portions to be annotated may be set. In such a case, the communication system may stop comparing message portions with predetermined triggers when the maximum number of message portions to be annotated has been identified.

Alternatively, the communication system may continuing comparing message portions with predetermined triggers until all message portions have been compared and select some of the message portions to be annotated. For example, message portions to be annotated may be selected on the subject matter of the message portion. In a more particular example, the following message:

Sender: Want to grab a bite of lunch? How about Mexican? I'm hungry let's go soon includes various message portions. In this example, a predetermined trigger is identified for each of the message portions "bite," "lunch," "Mexican," and "hungry." Each of the message portions "bite" and "hungry" are associated with a predetermined trigger for third-party information relating to a general list of restaurants, such as the third-party information 230 described previously with respect to FIGS. 2 and 3. By contrast, the message portion "lunch" is associated with a predetermined trigger for third-party information relating to a list of restaurants specializing in sandwiches, such as third-party information 330 described previously with respect to FIG. 3. Further, the message portion "Mexican" in proximity to the message portion lunch is associated with a list of restaurants specializing in Mexican cuisine. In this example, the communication system selects message portions "lunch" and "Mexican" to be annotated to present third-party information. The communication system does not annotate "bite" or "hungry," which provide less specific third-party information than provided by annotations of "lunch" and "Mexican."

The communication system categorizes the message portions by subject matter and geographic scope (step 616). For example, the communication system may categorize a message portion by subject matter by searching the message portion or other parts of the message for predefined keywords or phrases that are associated with third-party information. This may be accomplished techniques for categorizing, classifying and clustering natural language statements. The categorizing process may include techniques used to identify and filter spam messages, as well as identifying and categorizing content based on parental control techniques.

In some implementations, the communication system may use user profile information to disambiguate or otherwise supplement a search for third party content to be annotated to the message portion (by, e.g., supplementing the search with user profile information or terms).

The communication system may categorize a message portion by geographic scope, for example, by identifying the geographic location of the message sender. This may be accomplished by, for example, looking up a geographic location associated with the message sender in user profile data, such as the user profile data 514 described previously with respect to FIG. 5. In another example, identifying a geographic scope for the message may be performed based on the Internet Protocol (IP) address of the message sender or a geographic position supplied by a device associated with the message sender, such as a geographic location supplied by a mobile telephone or another type of device having geographic positioning capabilities.

The communication system identifies, based on the categorizations, third-party content related to message portions (step 620). This may be accomplished, for example, by using an association of a category and/or geographic locations with third-party content. In one example, a trigger may identify a category and/or geographic locations and be associated with third-party content, such as a web page represented by a domain name or IP address. The subject matter and geographic location identified for a message portion may be compared with the triggers, and, when a match of subject matter or geographic location between the trigger and the message portion is found, the third-party content associated with the trigger is identified as being applicable to the message portion.

In some implementations, the communication system may apply personalized annotations to third-party content (step 625). For example, the message sender may have identified particular third-party content to be associated with pre-defined text triggers. In a more particular example, a message sender may have identified particular web pages to be associated with particular triggers, such as a series of favorite restaurants of the message sender may have been identified to be associated with particular text used to trigger annotation of the message with the sender's list of favorite restaurants. Additionally or alternatively, a user could blacklist or otherwise identify certain triggers, content or types of content that are not to be associated with the user's messages. In some implementations, a message may be annotated with a third-party content associated with the message recipient.

The communication system generates a browser page based on identified third-party content (step 630). For example, with respect to FIG. 3, browser pages corresponding to instant message user interfaces 225, 330 and 340 may be generated.

The communication system annotates message portions with the network address (such as a uniform resource locator (URL)) for the generated browser page (step 632). To do so, for example, the portion of the message may be annotated by with a hyperlink to the network address of the generated browser page.

The communication system enables presentation of the message (including the annotated portion) to the recipient (step 635). This may be accomplished, for example, as described previously with respect to step 435 of FIG. 4.

Figure 7:
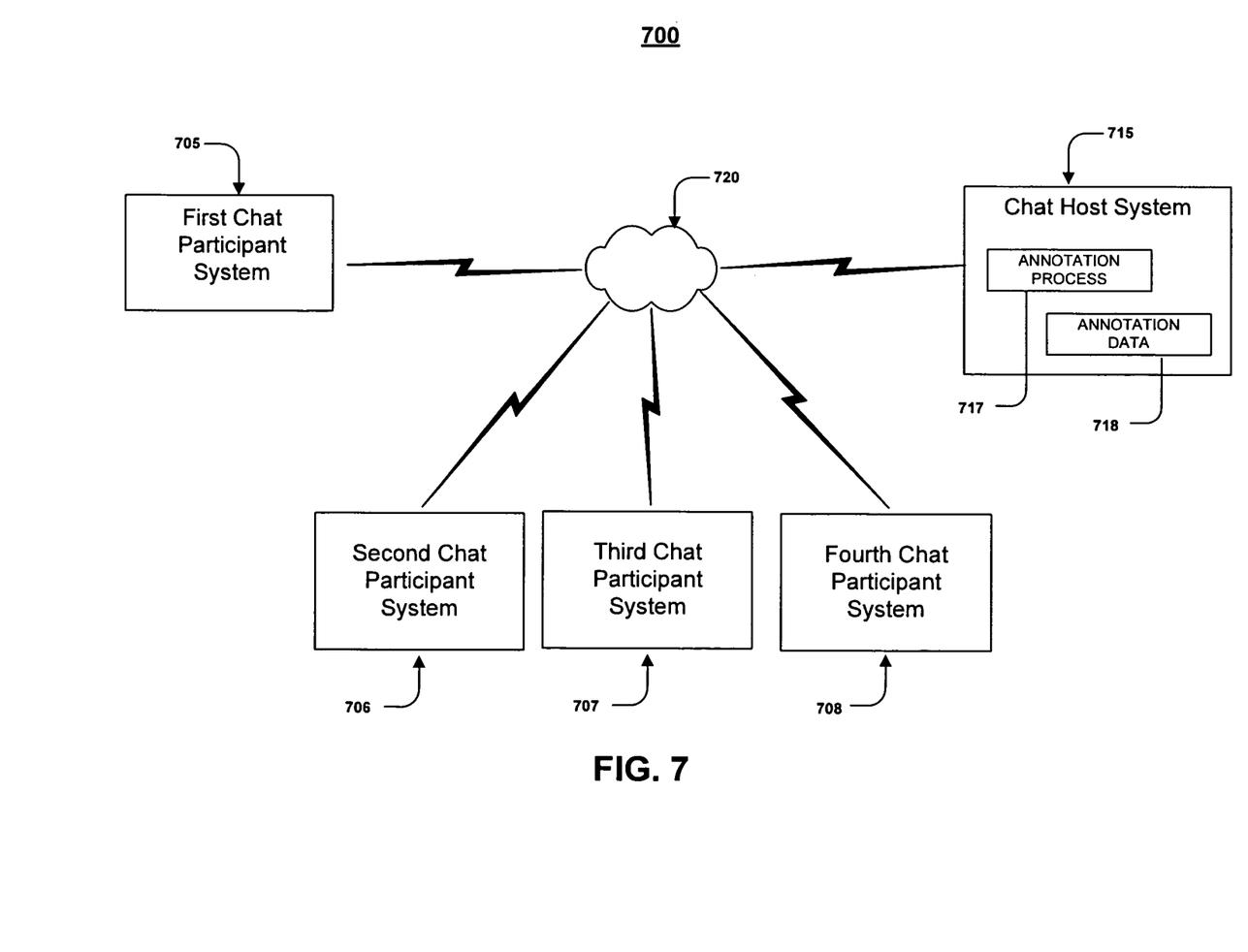

FIG. 7 illustrates an example communications system 700 that supports a communication service. The system 700 includes a first chat participant system 705 communicating with one or more other chat participant systems 706, 707 and 708 and a chat host system 715 through a communication link 720. The chat host system 715 is capable of annotating, with third-party content, instant messages exchanged between chat participant systems 705, 706, 707 and 708. The chat host system 715 includes annotation process software 717 and annotation data 718 for annotating, with third-party content, instant messages exchanged between chat participant systems 705, 706, 707 and 708.

Typically, chat communications involve an instantaneous or nearly instantaneous communication between two or more users, where each user is able to transmit, receive and display communicated information. Additionally, chat communications may involve the display and perception of on-line presence information regarding other users present in the chat room. However, chat communications may occur in the absence of on-line presence information. The chat communications may be machine-to-machine communications that occur without intervention by or communication through a chat server after a communication session is established or authentication is performed. Examples of chat communications includes those provided by AOL (America On-line), Yahoo, and MSN, among others.

Chat system users may be distributed geographically and may communicate with the chat host system 715 using chat participant systems, such as second chat participant system 706, third chat participant system 707, or fourth chat participant system 708. Second chat participant system 706 runs chat client software that communicates with corresponding chat host software on chat host system 715, by way of a browser or otherwise. Chat host system 715 coordinates chat sessions by receiving the textual, or other, input sent from a first chat participant system 705 or a second chat participant system 706 and replicating that input to other systems such as the second chat participant system 706 or the first chat participant system 705, as appropriate.

The chat host system 715 may support chat services irrespective of a first chat participant's network or Internet access. Thus, the chat host system 715 may allow users to send and receive messages, regardless of whether they have access to any particular ISP. The chat host system 715 also may support associated services, such as administrative matters, advertising, directory services, chat, and interest groups related to the chat. The chat host system 715 has an architecture that enables the devices (e.g., servers) within the chat host system 715 to communicate with each other. To transfer data, the chat host system 715 employs one or more standard or exclusive chat protocols.

To access the chat host system 715 to begin a chat session in the implementation of FIG. 7, the first chat participant system 705 establishes a connection to the chat host system 715. Once a connection to the chat host system 715 has been established, the first chat participant system 705 may directly or indirectly transmit data to and access content from the chat host system 715. By accessing the chat host system, a first chat participant can use the chat client application to view which other users (e.g., a "people here list") are on-line in the chat room, and/or exchange messages with the other users in the chat room. The user also may be supplied with other capabilities, such as the ability to trade files such as pictures, invitations or documents, find other users with similar interests, get customized information (such as news and stock quotes), and search the Web. The second chat participant system 706 may be similarly manipulated to establish a contemporaneous connection with chat host system 715.

Once connectivity is established, a first chat participant who is using the first chat participant system 705 may view whether a second chat participant using the second chat participant system 706 is on-line, and typically may view whether the second chat participant is able to receive messages. If the second chat participant is on-line, the first chat participant may exchange messages with the second chat participant.

In one implementation, the messages sent between first chat participant system 705 and second chat participant system 706 are routed through chat host system 715. In another implementation, the messages sent between first chat participant system 705 and second chat participant system 706 are routed through a third party server (not shown), and, in some cases, are also routed through chat host system 715. In yet another implementation, the messages are sent directly between first chat participant system 705 and second chat participant system 706.

When messages are exchanged between the chat participant systems 705, 706, 707 and 708, the chat host system 715 annotates the messages, or portions thereof, with third-party content. To do so, the chat host system 715 executes the annotation process software 717, which accesses annotation data 718 and other data, to annotate an instant message with third-party content. This may be accomplished, for example, by executing the process 400 described previously with respect to FIG. 4 or the process 600 described previously with respect to FIG. 6.

The techniques and concepts generally have been described in the context of an instant messaging system that uses an instant messaging host system to facilitate the instant messaging communication between instant message senders and instant message recipients. Other instant message implementations are contemplated, such as an instant message service in which instant messages are exchanged directly between an instant message sender system and an instant message recipient system.

Also, the techniques and concepts generally have been described with respect to a message exchanged between parties. Other implementations are contemplated, such as annotating words from distinct messages within a single communication session or stream between parties and annotating words from separate communication sessions or streams involving one or both parties.

The contemplated techniques may be applied to, for example, instant messaging, e-mail messaging, chat, blogging and SMS (short message service) messaging.

In an example within the blogging context, some of the words of a blogger's content may be turned into actionable icons when displayed to a user accessing (e.g., the blog reader) the blog. The actionable icons may be based on the geographic location of the blog reader. Alternatively or additionally, the actionable icons may be based on content interests of the blog reader and/or may be more general content believed to be of interest to multiple blog readers.

In an example within an e-mail messaging context, all or portions of the e-mail message content may be annotated with third-party content, such as by using similar techniques to those described with respect to FIGS. 4 and 6.

A news electronic delivery service may analyze a news article and annotate the article with third-party content. For example, a general or sports news service may analyze a news article and annotate with third-party content before sending an electronic version of the news article to a subscriber. The delivery service may annotate the term "tennis" in an article describing a tennis match such that information about tennis stores, racquet clubs or general sport equipment stores may be displayed.

Although the concepts and techniques have been described generally with regard to a computer system, the concepts and techniques also may be applicable to mobile communication devices, such as, for example, a mobile telephone, a personal communication device or a personal digital assistant (PDA) that is configured to access the Internet or another type of computer or communications network.

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made without departing from the spirit and scope of the claims. For example, useful results still could be achieved if steps of the disclosed techniques were performed in a different order and/or if components in the disclosed systems were combined in a different manner and/or replaced or supplemented by other components. As another example, a screen name is used throughout to represent a unique identifier of a communications identity, but any other unique identifier of a communications identity, such as a telephone number, may be used. Accordingly, other implementations are within the scope of the following claims.

What is claimed is:

1. A computer-implemented method for annotating a communication, the method comprising the following operations performed by at least one processor:

receiving, from a sender messaging identity or a recipient messaging identity, third-party information identified by the sender messaging identity or the recipient messaging identity as being associated with at least one of an identified trigger or at least one message category;

storing the received third-party information in a database;

receiving a first message sent from the sender messaging identity to the recipient messaging identity;

identifying, within at least a portion of the first message, at least one of the triggers identifying data included in the first message that is to be annotated, the identified triggers being associated with the third-party information in the at least one message category;

retrieving, from the database, information external to the first message and descriptive of at least one or the sender messaging identity or the recipient messaging identity;

categorizing the portion of the first message based on the retrieved information external to the first message and descriptive of at least one of the sender messaging identity or the recipient messaging identity;

comparing the at least one message category of the third-party information with the categorization of the portion of the first message;

identifying, based on the comparison, third-party information applicable to the portion of the first message, at least a portion of the identified third-party information including one or more items of the received third-party information previously identified by the sender messaging identity or the recipient messaging identity as being associated with at least one of the identified triggers or the at least one message category that is applicable to the portion of the first message;

annotating the portion of the first message to enable presentation of the applicable third-party information;

presenting the first message including the annotated portion of the first message to a display device for viewing by at least one of the sender messaging identity or the recipient messaging identity;

identifying, within at least a portion of a second message, other triggers identifying data included in the second message;

accessing additional information external to the second message and descriptive of at least one of the sender messaging identity or the recipient messaging identity;

identifying, based on the other identified triggers and the additional accessed information, other third-party information with which to annotate the second message;

annotating the portion of the second message to enable presentation of the other third-party information; and presenting the second message including the annotated portion of the second message to the display device for viewing by at least one of the sender messaging identity or the recipient messaging identity.

2. The method of claim 1, wherein the other third-party information includes more information than the applicable third-party information.

3. The method of claim 1, wherein at least one of the first message and the second message comprises at least one of a blog, an instant message, an electronic message, a chat message, and a short message service message.

4. The method of claim 1, wherein the annotated portion of the first message is at least one of a hyperlink, an animated icon, a computer-generated sound, an audio segment, and a video clip.

5. The method of claim 1, wherein the applicable third-party information relates to at least one of food, restaurants, vehicles, movies, clothing, shopping, and travel.

6. The method of claim 1, wherein the retrieved information external to the first message and descriptive of at least one of the sender messaging identity or the recipient messaging identity comprises a predefined association between first message content and third-party information.

7. The method of claim 6, wherein the first message content comprises text.

8. The method of claim 1, wherein the portion of the first message comprises the entire first message.

9. The method of claim 1, wherein the portion of the first message is a word in the first message.

10. The method of claim 1, wherein both of the first message and the second message are included in a single communication stream or session between the sender messaging identity and the recipient messaging identity.

11. The method of claim 1, wherein:

the first message is included in a first communication stream or session between the sender messaging identity and the recipient messaging identity; and the second message is included in a second communication stream or session between the sender messaging identity and the recipient messaging identity.

12. The method of claim 1, wherein:

the first message is included in a first communication stream or session between the sender messaging identity and the recipient messaging identity; and the second message is included in a second communication stream or session involving only one of the sender messaging identity and the recipient messaging identity.

13. The method of claim 1, wherein the portion of the first message is categorized based on the retrieved information, and a time at which the first message between the sender messaging identity and the recipient messaging identity was exchanged.

14. The method of claim 1, wherein:

retrieving information external to the first message and descriptive of at least one of the sender messaging identity or the recipient messaging identity includes retrieving profile information related to and descriptive of at least one of the sender messaging identity or the recipient messaging identity; and determining, based on the identified triggers and the retrieved information, third-party information with which to annotate the first message includes determining at least a portion of the retrieved profile information.

15. A system for annotating a communication, comprising:
  at least one processor; and
  at least one non-transitory computer-readable medium containing instructions that, when executed by the at least one processor, cause the system to perform operations comprising:
    receiving, from a sender messaging identity or a recipient messaging identity, third-party information identified by the sender messaging identity or the recipient messaging identity as being associated with at least one of an identified trigger or at least one message category;
    storing the received third-party information in a database;
    receiving a first message sent from the sender messaging identity to the recipient messaging identity;
    identifying, within at least a portion of the first message, at least one of the triggers identifying data included in the first message that is to be annotated, the identified triggers being associated with the third-party information in the at least one message category;
    retrieving, from the database, information external to the first message and descriptive of at least one or the sender messaging identity or the recipient messaging identity;
    categorizing the portion of the first message based on the retrieved information external to the first message and descriptive of at least one of the sender messaging identity or the recipient messaging identity;
    comparing the at least one message category of the third-party information with the categorization of the portion of the first message;
    identifying, based on the comparison, third-party information applicable to the portion of the first message, at least a portion of the identified third-party information including one or more items of the received third-party information previously identified by the sender messaging identity or the recipient messaging identity as being associated with at least one of the identified triggers or the at least one message category that is applicable to the portion of the first message;
    annotating the portion of the first message to enable presentation of the applicable third-party information;
    presenting the first message including the annotated portion of the first message to a display device for viewing by at least one of the sender messaging identity or the recipient messaging identity;
    identifying, within at least a portion of a second message, other triggers identifying data included in the second message;
    accessing additional information external to the second message and descriptive of at least one of the sender messaging identity or the recipient messaging identity;
    identifying, based on the other identified triggers and the additional accessed information, other third-party information with which to annotate the second message;
    annotating the portion of the second message to enable presentation of the other third-party information; and
    presenting the second message including the annotated portion of the second message to the display device for viewing by at least one of the sender messaging identity or the recipient messaging identity.

16. The system of claim 15, wherein the other third-party information includes more information than the applicable third-party information.

17. The system of claim 15, wherein at least one of the first message and the second message comprises at least one of a blog, an instant message, an electronic message, a chat message, and a short message service message.

18. The system of claim 15, wherein the retrieved information external to the first message and descriptive of at least one of the sender messaging identity or the recipient messaging identity comprises a predefined association between first message content and third-party information.

19. The system of claim 15, wherein both of the first message and the second message are included in a single communication stream or session between the sender messaging identity and the recipient messaging identity.

20. The system of claim 15, wherein:
  the first message is included in a first communication stream or session between the sender messaging identity and the recipient messaging identity; and
  the second message is included in a second communication stream or session between the sender messaging identity and the recipient messaging identity.

21. The system of claim 15, wherein the portion of the first message is categorized based on the retrieved information, and a time at which the first message between the sender messaging identity and the recipient messaging identity was exchanged.

22. The system of claim 15, wherein:
  retrieving information external to the first message and descriptive of at least one of the sender messaging identity or the recipient messaging identity includes retrieving profile information related to and descriptive of at least one of the sender messaging identity or the recipient messaging identity; and
  determining, based on the identified triggers and the retrieved information, third-party information with which to annotate the first message includes determining at least a portion of the retrieved profile information.

23. A non-transitory computer-readable medium containing instructions that, when executed by at least one processor, cause the processor to perform operations comprising:
  receiving, from a sender messaging identity or a recipient messaging identity, third-party information identified by the sender messaging identity or the recipient messaging identity as being associated with at least one of an identified trigger or at least one message category;
  storing the received third-party information in a database;
  receiving a first message sent from the sender messaging identity to the recipient messaging identity;
  identifying, within at least a portion of the first message, at least one of the triggers identifying data included in the first message that is to be annotated, the identified triggers being associated with the third-party information in the at least one message category;
  retrieving, from the database, information external to the first message and descriptive of at least one or the sender messaging identity or the recipient messaging identity;
  categorizing the portion of the first message based on the retrieved information external to the first message and descriptive of at least one of the sender messaging identity or the recipient messaging identity;

comparing the at least one message category of the third-party information with the categorization of the portion of the first message;

identifying, based on the comparison, third-party information applicable to the portion of the first message, at least a portion of the identified third-party information including one or more items of the received third-party information previously identified by the sender messaging identity or the recipient messaging identity as being associated with at least one of the identified triggers or the at least one message category that is applicable to the portion of the first message;

annotating the portion of the first message to enable presentation of the applicable third-party information;

presenting the first message including the annotated portion of the first message to a display device for viewing by at least one of the sender messaging identity or the recipient messaging identity;

identifying, within at least a portion of a second message, other triggers identifying data included in the second message;

accessing additional information external to the second message and descriptive of at least one of the sender messaging identity or the recipient messaging identity;

identifying, based on the other identified triggers and the additional accessed information, other third-party information with which to annotate the second message;

annotating the portion of the second message to enable presentation of the other third-party information; and presenting the second message including the annotated portion of the second message to the display device for viewing by at least one of the sender messaging identity or the recipient messaging identity.

24. The non-transitory computer-readable medium of claim 23, wherein the other third-party information is more specific than the applicable third-party information.

25. The non-transitory computer-readable medium of claim 23, wherein both of the first message and the second message are included in a single communication stream or session between the sender messaging identity and the recipient messaging identity.

26. The non-transitory computer-readable medium of claim 23, wherein:
the first message is included in a first communication stream or session between the sender messaging identity and the recipient messaging identity; and
the second message is included in a second communication stream or session between the sender messaging identity and the recipient messaging identity.

27. The non-transitory computer-readable medium of claim 23, wherein the portion of the first message is categorized based on the retrieved information, and a time at which the first message between the sender messaging identity and the recipient messaging identity was exchanged.

* * * * *